United States Patent
Xiong et al.

(10) Patent No.: US 10,891,945 B2
(45) Date of Patent: Jan. 12, 2021

(54) METHOD AND APPARATUS FOR JUDGING TERMINATION OF SOUND RECEPTION AND TERMINAL DEVICE

(71) Applicant: UBTECH ROBOTICS CORP., Shenzhen (CN)

(72) Inventors: Youjun Xiong, Shenzhen (CN); Haoming Li, Shenzhen (CN); Yanhui Xia, Shenzhen (CN); Liyang Li, Shenzhen (CN); Pinxiu Wen, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 159 days.

(21) Appl. No.: 16/232,051

(22) Filed: Dec. 26, 2018

(65) Prior Publication Data
US 2020/0074992 A1 Mar. 5, 2020

(30) Foreign Application Priority Data
Aug. 31, 2018 (CN) .......................... 2018 1 1011907

(51) Int. Cl.
*G10L 15/18* (2013.01)
*G10L 15/06* (2013.01)
*G10L 25/78* (2013.01)

(52) U.S. Cl.
CPC ........ *G10L 15/1815* (2013.01); *G10L 15/063* (2013.01); *G10L 25/78* (2013.01)

(58) Field of Classification Search
CPC .... G10L 15/1815; G10L 15/063; G10L 25/78
See application file for complete search history.

(56) References Cited

U.S. PATENT DOCUMENTS

| | | | |
|---|---|---|---|
| 9,437,186 B1* | 9/2016 | Liu | G10L 15/05 |
| 2015/0243300 A1* | 8/2015 | Muesch | G10L 19/012 |
| | | | 704/226 |
| 2019/0318759 A1* | 10/2019 | Doshi | G10L 15/05 |
| 2019/0325898 A1* | 10/2019 | O'Hart Kinney | G06F 40/20 |

* cited by examiner

*Primary Examiner* — Michelle M Koeth

(57) ABSTRACT

The present disclosure discloses a method and an apparatus for judging termination of sound reception and a terminal device. The method including: performing a voice activity detection on a current sound clip to obtain a first value; performing a semantic relevance detection on the current sound clip and a next sound clip by deep learning to obtain a second value; performing a weighted calculation on the first value and the second value to obtain a third value; comparing the third value with a preset threshold; and determining whether sound reception of the current sound clip is terminated based on the comparison result.

17 Claims, 2 Drawing Sheets

METHOD AND APPARATUS FOR JUDGING TERMINATION OF SOUND RECEPTION AND TERMINAL DEVICE

CROSS-REFERENCE TO RELATED APPLICATIONS

This application claims priority to Chinese Patent Application No. 201811011907.2, filed on Aug. 31, 2018, the contents of which are herein incorporated by reference in its entirety

TECHNICAL FIELD

The present disclosure relates to a field of judging termination of sound reception, and more particularly, to a method and an apparatus for judging termination of sound reception and a terminal device.

BACKGROUND

At present, language interaction between smart devices (for example, dialogue robots) and people is more and more frequent. In existing dialogue robots, since semantic meanings of human language cannot be directly understood, it is necessary to segment a collected sound into a plurality of independent statements, and each statement is processed to execute corresponding commands. Thus, it is relatively important how to recognize and accurately segment the collected sound into a plurality of independent statements. However, the existing dialogue robots judge whether human end up speaking only by judging whether there is pause in the speech, and then execute or process the ended speech, which may miss some follow-up information, thereby resulting in failure and error in execution, poorer accuracy and poor user experience. In addition, it is continuous for a multi-sound (such as human voice or television voice) scenario, it is impossible to judge whether human speech command is terminated or not, and thus it is impossible to correctly recognize human instruction information.

SUMMARY

The present disclosure provides a method and an apparatus for judging termination of sound reception and a terminal device, which can solve a problem that the accuracy in judging termination of language sound reception of an existing sound clip containing human voice is not high.

A technical solution adopted in the present disclosure is as below: there is provided a method for judging termination of sound reception. The method may include: performing a voice activity detection on a current sound clip to obtain a first value; performing a semantic relevance detection on the current sound clip and a next sound clip by deep learning to obtain a second value; performing a weighted calculation on the first value and the second value to obtain a third value; comparing the third value with a preset threshold; and determining whether sound reception of the current sound clip is terminated based on the comparison result.

To solve the above technical problem, another technical solution adopted in the present disclosure is as below: there is provided an apparatus for judging termination of sound reception. The apparatus may include a memory and a processor, wherein the memory is configured to store computer instructions, the processor connects to the memory and executes the computer instructions and is configured to: perform a voice activity detection on a current sound clip to obtain a first value; perform a semantic relevance detection on the current sound clip and a next sound clip by deep learning to obtain a second value; performing a weighted calculation on the first value and the second value to obtain a third value; compare the third value with a preset threshold; and determine whether sound reception of the current sound clip is terminated based on the comparison result.

To solve the above technical problem, still another technical solution adopted in the present disclosure is as below: there is provided a terminal device. The terminal device comprising: a memory, a processor, and a computer program stored in the memory and executable by the processor; wherein the processor is configured to, when executes the computer program, implement following operations: performing a voice activity detection on a current sound clip to obtain a first value; performing a semantic relevance detection on the current sound clip and a next sound clip by deep learning to obtain a second value; performing a weighted calculation on the first value and the second value to obtain a third value; comparing the third value with a preset threshold; and determining whether sound reception of the current sound clip is terminated based on the comparison result.

Beneficial effects of the present disclosure are as below: different from the related art, the present disclosure provides a method and an apparatus for judging termination of sound reception and a terminal device. A first value is obtained for a current sound clip by performing a voice activity detection. A second value is obtained by performing a semantic relevance detection on the current sound clip and a next sound clip by deep learning, and a weight calculation result of the first value and the second value is compared with a preset threshold. It is determined that the sound reception of the current sound clip has been terminated when the weight calculation result is smaller than the preset threshold. Compared with an existing technology in which it is determined whether the sound reception is terminated only by using a voice activity detection manner, the present disclosure introduces a deep learning method to perform semantic paraphrase and relevance calculation. In this way, accuracy in judging termination of sound reception is enhanced.

DETAILED DESCRIPTION

A clear and complete description of the technical schemes in the embodiments of the present disclosure will be made below with reference to the accompanying drawings in the embodiments of the present disclosure. Apparently, the embodiments as recited herein are merely a part of embodiments of the present disclosure instead of all embodiments. All other embodiments obtained by a person of ordinary skill in the art based on the embodiments of the present disclosure without creative efforts shall fall within the protection scope of the present disclosure.

In addition, when the embodiments of the present disclosure have descriptions related to "first" and "second" or the like, the descriptions related to "first" and "second" or the like are used only for purposes of description and are not interpreted as indicating or implying relative importance or implying the number of indicated technical features. Thus, the feature defined with "first" and "second" may explicitly or implicitly include at least one such feature. In addition, the technical solutions of various embodiments may be combined with each other, based on a fact that these technical solutions can be implemented by those of ordinary skill in the art. When combination of technical solutions is contradictory or unachievable, it is believed that the combination of the technical solutions does not exist and is not within the scope of protection claimed by the utility model.

Figure 1:
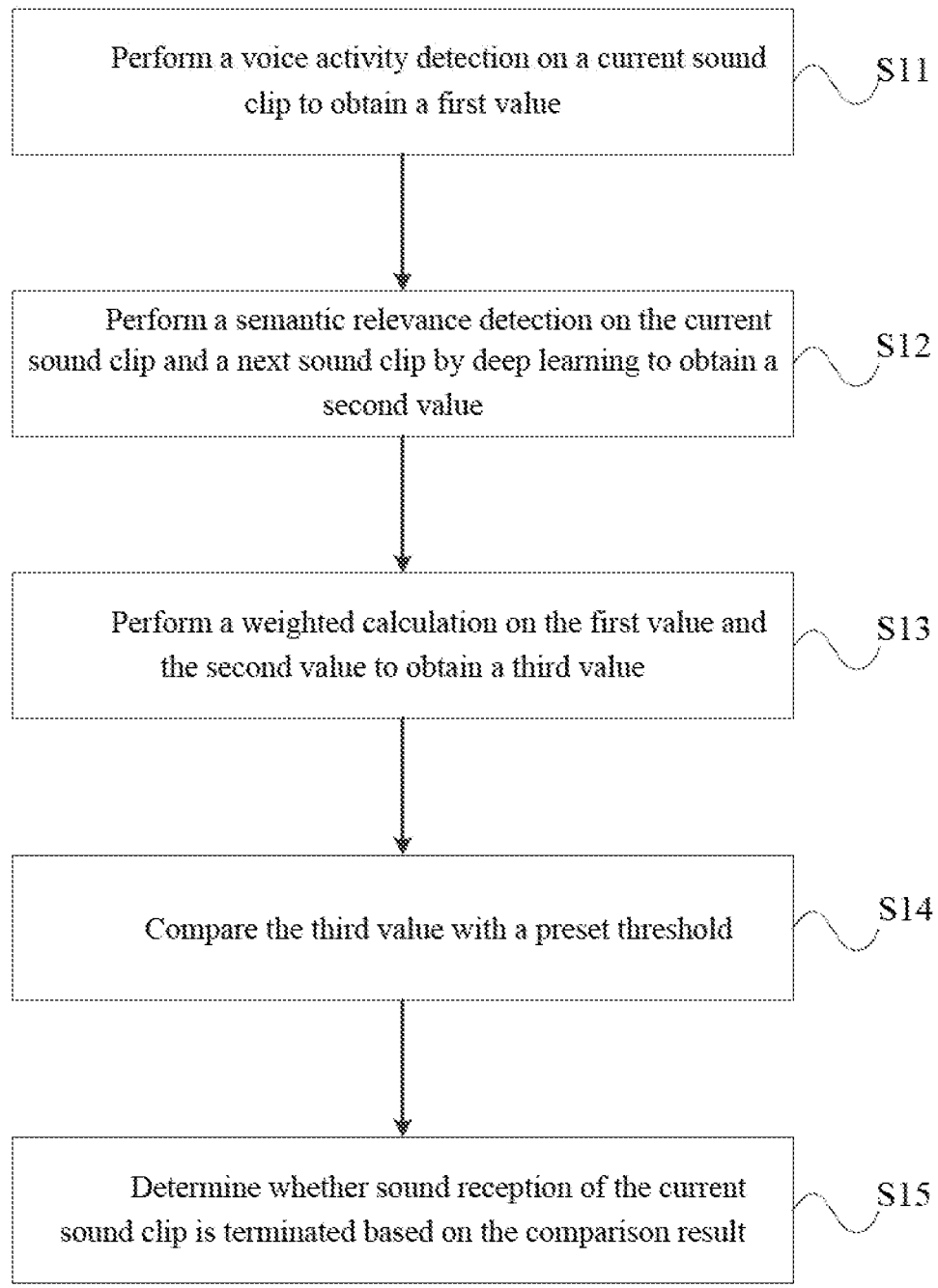
FIG. 1 is a schematic structural diagram of a method for judging termination of sound reception according to an embodiment of the present disclosure.

Referring to FIG. 1, a schematic flow diagram of a method for judging termination of sound reception according to the present disclosure is illustrated. The method specifically may include following blocks.

In block S11, a voice activity detection is performed on a current sound clip to obtain a first value.

In a specific application scenario, first the voice activity detection may be performed on the currently collected sound clip to obtain a language-related endpoint value in the sound clip, wherein the language-related endpoint value specifically is an end identifier in the voice activity. The sound itself is a wave and has a certain energy, including characteristics of frequency and amplitude. Therefore, the sound clip may be divided into a plurality of data frames during the detection process, and then it is judged whether there is a sudden drop in energy of the plurality of data frames, or it is judged, based on sudden change of frequency and amplitude, whether the voice activity in the sound clip is stopped, i.e., whether the voice activity in the sound clip is ended. In this way, the first value is obtained, where the first value is the endpoint value or the voice activity end identifier of the sound clip. For example, the first value may be denoted by 0 or 1. Specifically, the first value may be 0 when the voice activity in the sound clip is stopped; otherwise the first value may be 1. Alternatively, the first value may be 1 when the voice activity in the sound clip is stopped; otherwise the first value may be 0.

In other embodiments, other commonly-used methods also may be employed to judge whether the voice activity in the sound clip is stopped, which is not limited herein.

In block S12, a semantic relevance detection is performed on the current sound clip and a next sound clip by deep learning to obtain a second value.

The deep learning can form a more abstract high-level representation attribute category or feature by combining low-level features to discover distributed feature representation of data. Although a general computer may only convert a human language into a machine language for the simplest processing, the human language may be further learned using the deep learning for paraphrasing and explanation so as to obtain its approximate semantic meanings and make an in-depth improvement. Although the computer itself does not have an understanding function, this does not hinder the computer from extending based on the related semantic meanings for processing and execution.

In this embodiment, semantic paraphrase may be performed on the current sound clip by using the deep learning method to obtain its approximate semantic meanings. Next semantic paraphrase may be performed on the next sound clip to obtain its approximate semantic meanings. Then it is judged whether voice in the current sound clip is semantically associated with voice in the next sound clip, and it is judged whether sentences are coherent and smooth. For example, the semantic meaning of the voice in the current sound clip may be "I need", and the semantic meaning of the voice in the next sound clip may be "turn the volume up", which conforms to human speaking habits. Through deep learning, it may be believed that the two clips are correlated, and the correlation determines the second value. The stronger the correlation is, the larger the second value is. For example, the correlation may range from 0% to 100%, and the second value may range from 0 to 1. The second value of the above two sound clips may be 0.5. In another embodiment, the semantic mean of the voice in the current sound clip may be "dance", and the semantic meaning of the voice in the next sound clip may be "turn on the lamp". The two semantic meanings have different paraphrases, and they do not conform to coherence of human speech, and it is relatively difficult to believe the two clips are correlated. Therefore, it is believed that the two clips are non-correlated or weakly correlated. Alternatively, in another scenario, for example, the semantic meaning of the voice in the current sound clip may be "dance", and the next sound clip has nothing but some ambient noise. Therefore, it may be believed that the two clips are non-correlated, and their second values may be, for example, 0.

In other embodiments, an end word in the current sound clip and a beginning word in the next sound clip may be paraphrased or spelt to improve the correlation between the two sound clips, thereby increasing the accuracy rate of correlation judgment.

In the meanwhile, the correlation also may be judged by means of other language features such as intonation. Alternatively, language habits of the current user may be further learned for many times by a robot or other computer intelligent devices such as a domestic robot to learn language features of the user, and to modify the correlation, a preset threshold and a preset weight based on the language features, so as to improve the judgment accuracy.

In block S13, a weighted calculation is performed on the first value and the second value to obtain a third value.

The fist value and the second value have been obtained above. In order to achieve better accuracy, a weighted calculation needs to be performed on the first value and the second value to obtain a third value serving as a total correlation of the two sound clips. For example, a preset weight is assigned to the first value to obtained a first weight value, another preset weight is assigned to the second value to obtained a second weight value, and the weighted calculation is performed on the first weight value and the second weight value to obtain the third value. For example, in a specific scenario, when the first value is 0, this indicates that the current sound clip has a phenomenon of the voice activity termination. For example, when the second value is 0.5, this indicates that the two sound clips are moderately correlated. For example, when both the first preset weight and the second preset weight are set as 0.5, the third value in this scenario is 0.5*0+0.5*0.5=0.25.

In block S14, the third value is compared with a preset threshold.

After the third value is obtained the third value is compared with the preset threshold to judge whether sound reception of the current sound clip has been terminated. For example, in a specific application scenario, the preset threshold may be set as 0.4. It is noted that, the settings of the weight and the threshold are not fixed, but is a perfect process with the deep learning to achieve a better judgment accuracy rate.

In block S15, the current sound clip is determined whether sound reception is terminated based on the comparison result.

After the third value has been obtained and the preset threshold also has been set in the above specific scenario. For example, when the third value is 0.25 and the preset threshold is 0.4, since 0.25<0.4, the third value is less than the preset threshold, and it may be determined that sound reception of the current sound clip has be terminated.

In other embodiments, the preset threshold may be set according to a specific situation. For example, it may be determined that sound reception is terminated when the third value is greater than the preset threshold.

After one judgment is completed, the next sound clip is further used as the current sound clip regardless of the comparison result, and a further next sound clip is used as a next sound clip next to the current sound clip to repeat the above detection and judgment.

In conclusion, according to the above embodiments, a first value is obtained for a current sound clip by performing a voice activity detection. A second value is obtained by performing a semantic relevance detection on the current sound clip and a next sound clip by deep learning, and a weight calculation result of the first value and the second value is compared with a preset threshold. It is determined that the sound reception of the current sound clip has been terminated when the weight calculation result is smaller than the preset threshold. Compared with an existing technology in which it is determined whether the sound reception is terminated only by using a voice activity detection manner, the present disclosure introduces a deep learning method to perform semantic paraphrase and relevance calculation of a current language segment and a next language segment so as to determine whether the next language segment is a syntactic extension of the current language segment. In this way, an error in judging termination of sound reception is reduced, and accuracy in judging termination of sound reception is increased.

Figure 2:
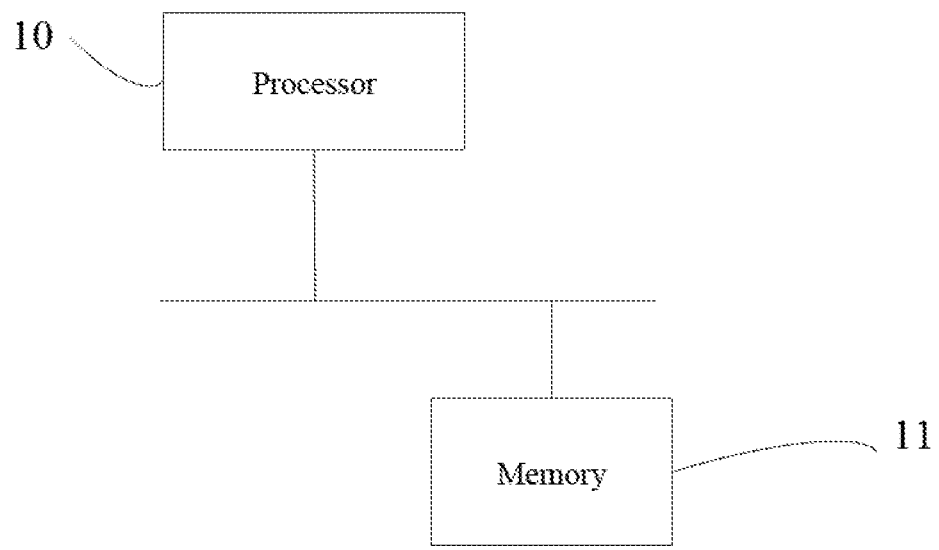
FIG. 2 is a schematic structural diagram of an apparatus for judging termination of sound reception according to an embodiment of the present disclosure.

Referring to FIG. 2, a schematic structural diagram of an apparatus for judging termination of sound reception according to an embodiment of the present disclosure is illustrated.

The apparatus for judging termination of sound reception provided by this embodiment may specifically include a processor 10 and a memory 11, wherein the processor 10 connects the memory 11.

The processor 10 also may be referred to as a central processing unit (CPU). The processor 10 may be an integrated circuit chip and has a signal processing capability. The processor 10 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor or the like.

In this embodiment, the processor 10 may perform a voice activity detection on a current sound clip to obtain a first value, and may perform a semantic relevance detection on the current sound clip and a next sound clip by deep learning to obtain a second value. Furthermore, the processor also may perform a weighted calculation on the first value and the second value to obtain a third value, and may compare the third value with a preset threshold. The processor determines that sound reception of the current soured clip is terminated when the third value is smaller than the preset threshold.

Other module terminals of the above devices may respectively perform the blocks corresponding to the above method embodiments, and thus detailed descriptions of the modules are omitted here because the above descriptions of corresponding blocks may serve as a reference.

Figure 3:
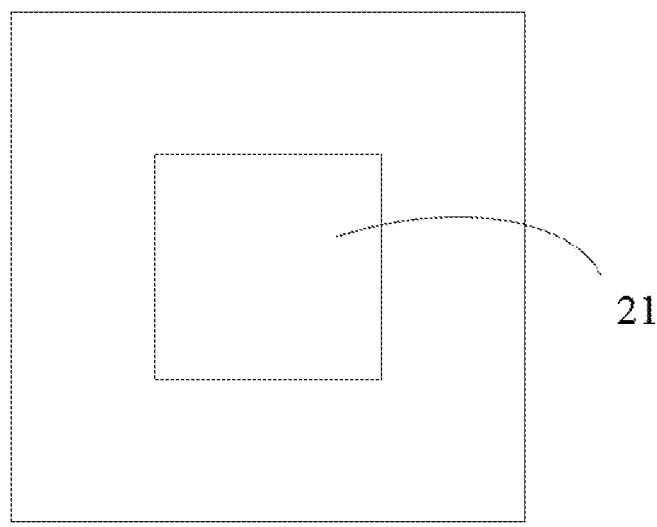
FIG. 3 is a schematic structural diagram of a storage apparatus according to an embodiment of the present disclosure.

Referring to FIG. 3, a schematic structural diagram of a storage apparatus according to an embodiment of the present disclosure is illustrated. The storage apparatus may store an instruction file 21 capable of implementing all the methods mentioned above. The instruction file 21 may be stored in the above storage apparatus in the form of software products, which also may be data recording various computations, comprising some instructions to cause a computer device (a personal computer, a server, an intelligent robot, or a network device and so on) or a processor to execute all or a part of blocks of the methods as recited in the embodiments of the present disclosure.

Having certain independence, the instruction file 21 may continue to cooperate with the processor 10 to execute relevant instructions when an operation system or a backup system goes wrong, such that the instruction file 21 is not substituted, damaged or emptied during upgrading or guiding a program upgrading and repairing.

The aforementioned storage apparatus includes a USB flash disk, a mobile hard disk, a read-only memory (ROM), a random access memory (RAM), a magnetic disk or an optical disk and other media capable of storing a program code, of a terminal device such as a computer, a server, a mobile phone or a tablet computer, etc.

In conclusion, according to the embodiments of the present disclosure, a first value is obtained for a current sound clip by performing a voice activity detection. A second value is obtained by performing a semantic relevance detection on the current sound clip and a next sound clip by deep learning, and a weight calculation result of the first value and the second value is compared with a preset threshold. It is determined that the sound reception of the current sound clip has been terminated when the weight calculation result is smaller than the preset threshold. Compared with an existing technology in which it is determined whether the sound reception is terminated only by using a voice activity detection manner, the present disclosure introduces a deep learning method to perform semantic paraphrase and relevance calculation of a current language segment and a next language segment so as to determine whether the next language segment is a syntactic extension of the current language segment. In this way, an error in judging termination of sound reception is reduced, accuracy in judging termination of sound reception is increased, and user experience is enhanced.

The above are merely embodiments of the present disclosure and are not intended to limit the patent scope of the present disclosure. Any modifications of equivalent structure or equivalent process made on the basis of the contents of the description and accompanying drawings of the present disclosure or directly or indirectly applied to other related technical fields shall similarly fall within the scope of patent protection of the present disclosure.

What is claimed is:

1. A method for judging termination of sound reception, comprising:

performing a voice activity detection on a current sound clip to obtain a first value;

performing a semantic relevance detection on the current sound clip and a next sound clip by deep learning to obtain a second value;

performing a weighted calculation on the first value and the second value to obtain a third value;
comparing the third value with a preset threshold; and
determining whether sound reception of the current sound clip is terminated based on the comparison result;
wherein the performing the weighted calculation on the first value and the second value to obtain the third value comprises:
assigning a first preset weight to the first value to obtain a first weight value;
assigning a second preset weight to the second value to obtain a second weight value; and
performing the weighted calculation on the first weight value and the second weight value to obtain the third value.

2. The judgment method according to claim 1, wherein the performing the semantic relevance detection on the current sound clip and the next sound clip by deep learning to obtain the second value comprises:
performing a semantic paraphrase on the current sound clip and the next sound clip and detecting the semantic relevance between the current sound clip and the next sound clip to obtain the second value for the current sound clip and the next sound clip.

3. The judgment method according to claim 2, wherein the detecting the semantic relevance between the current sound clip and the next sound clip comprises:
determine whether voice in the current sound clip is semantically associated with voice in the next sound clip, and determine whether sentences are coherent.

4. The judgment method according to claim 2, further comprising:
performing a semantic paraphrase on an end word in the current sound clip and a beginning word in the next sound clip.

5. The judgment method according to claim 1, wherein the performing the voice activity detection on the current sound clip to obtain the first value comprises:
segmenting the current sound clip into a plurality of data frames, and processing the plurality of data frames to obtain the first value for the current sound clip.

6. The judgment method according to claim 5, wherein the processing the plurality of data frames to obtain the first value for the current sound clip comprises:
determine whether there is a sudden drop in energy of the plurality of data frames; or
determine whether there is a sudden change of frequency and amplitude.

7. The judgment method according to claim 1, wherein the first value is a voice end identifier of the current sound clip, and the first value is used for identifying whether a cease phenomenon exists in the voice activity of the current sound clip.

8. An apparatus for judging termination of sound reception, comprising a memory and a processor, wherein the memory is configured to store computer instructions, the processor connects to the memory and executes the computer instructions and is configured to:
perform a voice activity detection on a current sound clip to obtain a first value; perform a semantic relevance detection on the current sound clip and a next sound clip by deep learning to obtain a second value; perform a weighted calculation on the first value and the second value to obtain a third value; compare the third value with a preset threshold; and determine whether sound reception of the current sound clip is terminated based on the comparison result;
wherein the performing the weighted calculation on the first value and the second value to obtain the third value comprises:
assigning a first preset weight to the first value to obtain a first weight value;
assigning a second preset weight to the second value to obtain a second weight value; and
performing the weighted calculation on the first weight value and the second weight value to obtain the third value.

9. The judgment apparatus according to claim 8, wherein the performing the semantic relevance detection on the current sound clip and the next sound clip by deep learning to obtain the second value comprises:
performing a semantic paraphrase on the current sound clip and the next sound clip and detecting the semantic relevance between the current sound clip and the next sound clip to obtain the second value for the current sound clip and the next sound clip.

10. The judgment apparatus according to claim 9, wherein the detecting the semantic relevance between the current sound clip and the next sound clip comprises:
determine whether voice in the current sound clip is semantically associated with voice in the next sound clip, and determine whether sentences are coherent.

11. The judgment apparatus according to claim 9, further comprising:
performing a semantic paraphrase on an end word in the current sound clip and a beginning word in the next sound clip.

12. The judgment apparatus according to claim 8, wherein the performing the voice activity detection on the current sound clip to obtain the first value comprises:
segmenting the current sound clip into a plurality of data frames, and processing the plurality of data frames to obtain the first value for the current sound clip.

13. The judgment apparatus according to claim 12, wherein the processing the plurality of data frames to obtain the first value for the current sound clip comprises:
determine whether there is a sudden drop in energy of the plurality of data frames; or
determine whether there is a sudden change of frequency and amplitude.

14. A terminal device, comprising:
a memory, a processor, and a computer program stored in the memory and executable by the processor; wherein the processor is configured to, when executing the computer program, implement the following operations:
performing a voice activity detection on a current sound clip to obtain a first value;
performing a semantic relevance detection on the current sound clip and a next sound clip by deep learning to obtain a second value;
performing a weighted calculation on the first value and the second value to obtain a third value;
comparing the third value with a preset threshold; and
determining whether sound reception of the current sound clip is terminated based on the comparison result;
wherein the performing the weighted calculation on the first value and the second value to obtain the third value comprises:
assigning a first preset weight to the first value to obtain a first weight value;
assigning a second preset weight to the second value to obtain a second weight value; and performing the weighted calculation on the first weight value and the second weight value to obtain the third value.

15. The terminal device according to claim 14, wherein the performing the semantic relevance detection on the current sound clip and the next sound clip by deep learning to obtain the second value comprises:
performing a semantic paraphrase on the current sound clip and the next sound clip and detecting the semantic relevance between the current sound clip and the next sound clip to obtain the second value for the current sound clip and the next sound clip.

16. The terminal device according to claim 15, further comprising:
performing a semantic paraphrase on an end word in the current sound clip and a beginning word in the next sound clip.

17. The terminal device according to claim 14, wherein the performing the voice activity detection on the current sound clip to obtain the first value comprises:
segmenting the current sound clip into a plurality of data frames, and processing the plurality of data frames to obtain the first value for the current sound clip.

\* \* \* \* \*